AUTOMATIC TELEPHONE SYSTEMS

Filed June 16, 1954 2 Sheets-Sheet 1

Inventor
F. P. GOHOREL
By Robert Harding Jr.
Attorney

Sept. 2, 1958 F. P. GOHOREL 2,850,575

AUTOMATIC TELEPHONE SYSTEMS

Filed June 16, 1954 2 Sheets-Sheet 2

Inventor
F. P. GOHOREL
By Robert Harding Jr.
Attorney

United States Patent Office 2,850,575

Patented Sept. 2, 1958

2,850,575

AUTOMATIC TELEPHONE SYSTEMS

Fernand Pierre Gohorel, Antony, France, assignor to International Standard Electric Corporation, New York, N. Y., a corporation of Delaware Application June 16, 1954, Serial No. 437,165

Claims priority, application France July 16, 1953

6 Claims. (Cl. 179—18)

The present invention refers to automatic telephone systems and more particularly to registering devices designed to route calls to step-by-step type automatic switchboards.

In such switchboards the number of selection stages required to reach a subscriber can vary according to the destination of the call; it suffices that the number of digits in the call number of the called subscriber agrees with the number of selections to be made. This number of digits is not uniform and can vary within very broad limits.

If such an automatic switchboard must be reached through an exchange using a register, it would be necessary to be able to release this register after the sending out of the last digit of the called subscriber's number. The register must therefore comprise arrangements to determine whether the last digit received and the last digit sent out are actually the last digits to be received and to be sent out.

Automatic switchboards of the above-mentioned type give no indication when the last selection has been made; the register alone, and according to the call number received, must determine the number of digits corresponding to that call number. Such a determination is an involved matter and may lead to complex and costly arrangements.

The purpose of this invention is to overcome these drawbacks and not to require the register to control the number of digits in the call number dialed, so that it becomes unnecessary to provide an end-of-selection signal.

One of the features of the invention lies in a register that, when it has received the pulses required for the selections in the automatic switchboard whereof it forms part and has controlled said selections, sends out in succession the digits received from the calling subscriber and required for the selection in the step-by-step automatic switchboard, it being possible for the last digit sent out to be or not to be the last digit of the called subscriber's number, said register releasing as soon as this last digit has been sent out and the calling subscriber sending the next digits, if any, directly to the step-by-step automatic switchboard.

Certain arrangements must be provided in order to prevent the digits sent by the calling subscriber directly to the step-by-step automatic switchboard from being lost or simply mutilated.

Another feature of the invention lies in the fact that the register does not release until after it has sent out all the digits it has received, and provided no other digit is then being received, and in that the release of said register cannot therefore take place at any stage of the registration until after a digit whose reception has begun has been fully registered and sent out.

Another feature of the invention lies in the fact that, when the register has controlled the selections in the automatic switchboard whereof it forms part and has sent out all the digits received, it releases only after a certain delay following the sending out of the last digit, so as to allow the hunting for a free line by the selector that has received said digit.

Another feature of the invention lies in arrangements in the register to prevent, upon the direct connection of the calling line to the outgoing circuit, in case there are still digits to be sent, an untimely breaking of the connection that would be interpreted as a dialing pulse by the distant exchange.

Another feature of the invention lies in the fact that, when all the conditions required for the release of the register have been met, the operation of a relay is caused in said register that establishes a physical connection between the incoming and outgoing line wires and controls the release, this connection being held until the register is fully released, thus preventing any untimely breaking of the line wires.

Various other features of the invention will become apparent from the following description, given as a nonlimitative example, with reference to the accompanying drawing, in which.

In the description that follows, the case will be discussed of a call originating at a register-equipped exchange and intended for a system equipped with step-by-step selectors.

Figure 1:
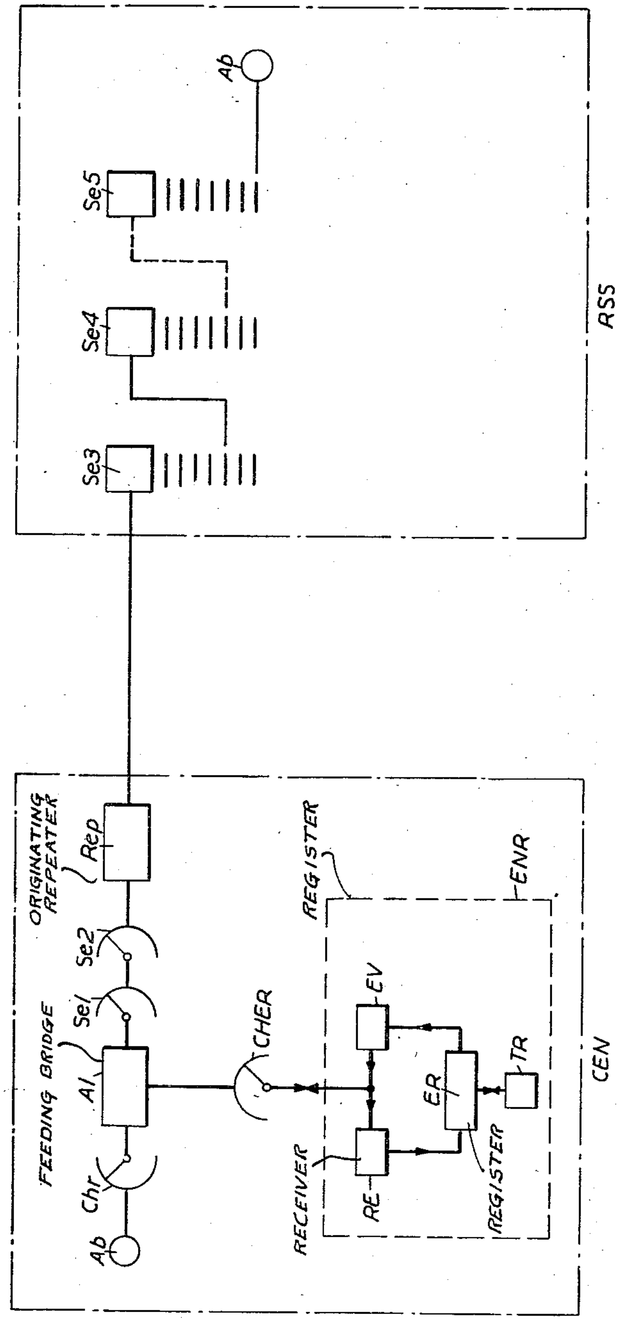
Fig. 1 is a switching diagram used to explain the general operation of the system in the case of a call intended for a step-by-step network.

When subscriber *Ab* served by exchange CEN (Fig. 1) removes his handset he is connected to a register ENR through finder *Chr*, feeding bridge AL and register finder CHER.

Throughout what follows, the term "feeding bridge" will be used to designate the set of members that connects the hunting chain to the selection chain and that comprises arrangements for feeding the handset of the calling subscriber and, if need be, the handset of the called subscriber.

Subscriber *Ab* dials the number of the called subscriber, who is assumed to be served by exchange RSS. This exchange comprises step-by-step type selectors *Se*3, *Se*4, *Se*5 and has no register. This number of three selectors is given only as an example; it is essentially variable according to the exchanges involved.

The prefix dialed by the calling subscriber is received by register ENR and translated. The translated digits will be used to route local selectors *Se*1 and *Se*2 to the circuit terminating at distant exchange RSS.

The numerical portion of the call number is sent through originating repeater R*ep* to the selection stages of distant exchange RSS.

However, in systems using step-by-step selectors the number of digits in the call numbers is not uniform and can vary between very broad limits.

When the register has received the pulses required for the local selections, it causes the routing of selectors *Se*1 and *Se*2 to originating repeater R*ep*.

While it is making these local selections the calling subscriber continues to dial; the digits he sends are received by the register. Once the local selections have been made, the register sends out all the digits and then releases; the calling subscriber is then connected directly to originating repeater R*ep* through finder *Chr*, feeding bridge AL and selectors *Se*1 and *Se*2. The next digits are then sent directly from the calling subscriber to selectors *Se*3, *Se*4, *Se*5 of the distant step-by-step office.

The release of the register involved must be made subject to certain rules in order to prevent some of the digits dialed by the calling subscriber from being lost or mutilated; but it will not be possible to do this before a certain period of time has elapsed after the last digit sent out by the register, so as to allow the hunting for a trunk by the step-by-step selector before the circuits are used for this routing.

In effect, the reception of the dial pulses, their coding in receiver RE and their registration in register ER are identical with those described in my patent application Serial No. 392,713, filed November 17, 1953, now U. S. Patent No. 2,770,676. Only such circuit components as are necessary for an understanding of the invention are shown in the accompanying diagrams.

Some of the relays used are relays having two contact-spring assemblies. The contacts of each assembly are designated by a group of two letters followed by one of digits 1 to 9, the only difference between the reference numbers of the two assemblies being the second letter. The relay to which these assemblies belong is designated by a group of three letters, the first a capital letter, characterizing the relay, the other two being small letters, characterizing the two assemblies.

Thus the second contact of each of the assemblies of relay A*yz* is designated by references A*y*2 and A*z*2.

Relays comprising only one contact assembly are designated by a group of two letters.

It will be assumed that the calling subscriber has started to dial the called subscriber's number. The prefix and a certain number of digits of the numerical portion have been registered in register ER.

Figure 2:
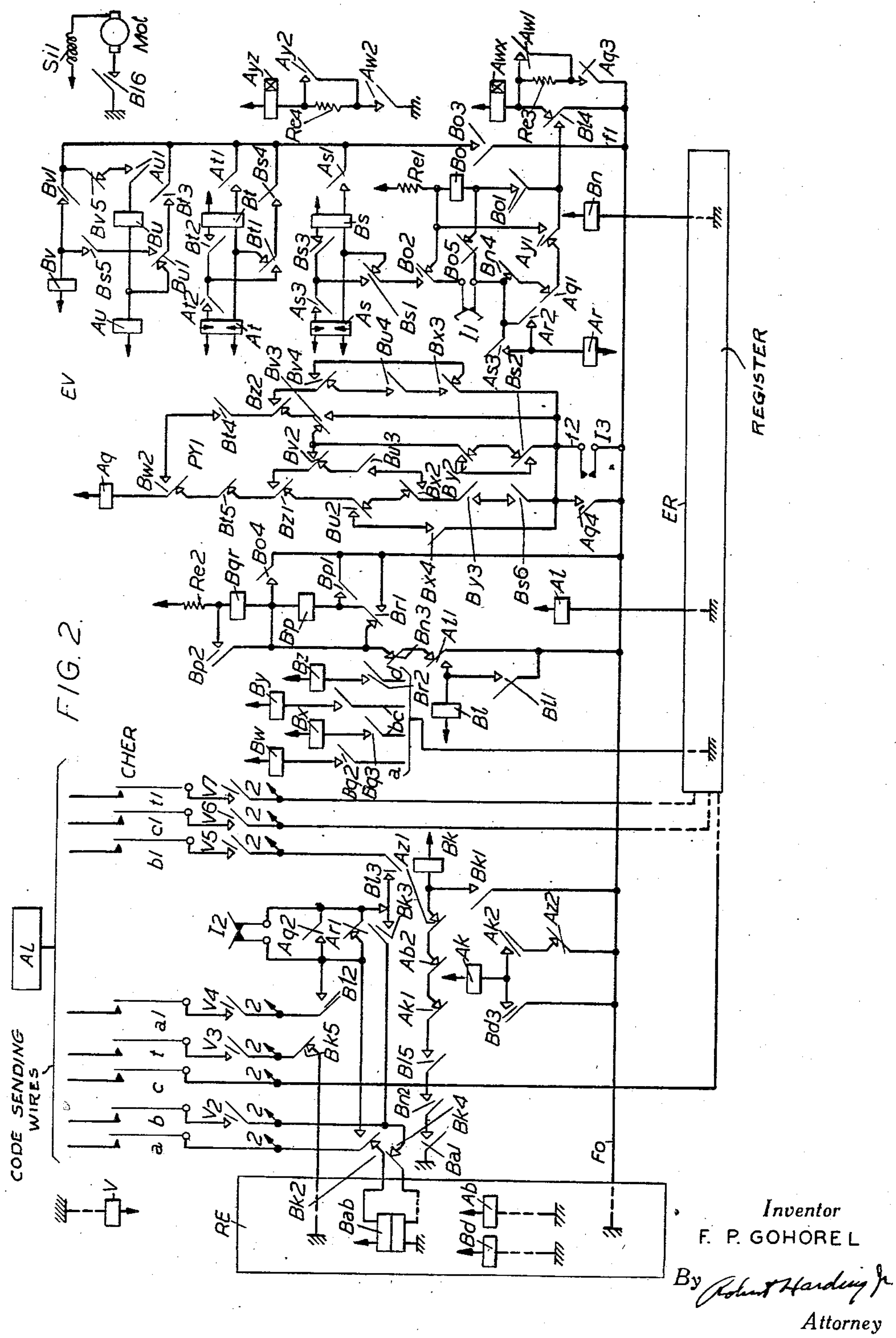
Fig. 2 shows such circuit components of a register as are required for an understanding of the invention.

It will further be assumed that all the codes that allow routing the selectors to the corresponding originating repeater have been sent. The operations involved in sending the digits registered to the step-by-step system before the register has released will now be described in connection with Fig. 2 which shows the receiver RE, the register ER and the transmitter EV of Fig. 1 in more detail.

It will be assumed that all the local selections have been made and that the sender is in the position corresponding to the exploration of the first selective combination that is to be sent to the distant step-by-step exchange. One or more of the four wires *a, b, c, d* shown connected to the register ER are grounded by the register, thus characterizing the selective combination to be sent. The corresponding relays B*w* . . . B*z* are energized. Further, the magnet V associated with register finder CHER is also energized.

The relay A*l* that prepares the sending of the decimal pulses is also energized by the register ER and it is assumed that the repeater has sent the signal to the register ER indicating that it was ready to receive the decimal pulses.

Relay A*l* completes the following circuit over its front A*l*1: battery, relay B*l*, front A*l*1, general holding ground on wire *f*0. Relay B*l* energizes.

Upon energizing, relay B*l* completes the circuit for sending the decimal pulses over wires *a*1, *b*1 in a manner to be described.

Over its front B*l*1 relay B*l* completes a holding circuit for itself to the general holding ground. Over its front B*l*2 and B*l*3 it loops wires *a*1 and *b*1: wire *a*1, contact of finder CHER, front V4 and B*l*2, back A*r*1, back B*k*3, front B*l*3 and V5, contact of finder CHER, wire *b*1. Wires *a*1 and *b*1 are the code sending wires. Over its front B*l*6 relay B*l* completes the following starting circuit for pulsing motor M*ot*: Battery, self-induction coil S*i*1, motor M*ot*, front B*l*6, ground. The pulsing motor M*ot* has three sets of interrupter springs, $I_1$, $I_2$, and $I_3$. Over its front B*l*4 relay B*l* completes the following circuit: general holding ground, front B*l*4, back A*y*1, A*q*1, B*n*4, B*o*5, relay B*o*, resistance R*e*1, battery. Relay B*o* energizes when pulse spring I1 are opened and will control the starting of the counting circuit of the pulses sent.

Over its front B*o*1 relay B*o* completes a holding circuit for itself to the general holding ground. Over its back B*o*2 it prevents relay B*o* from being subsequently short-circuited by pulse springs I1.

Over its front B*o*2 it completes the following circuit when pulse springs I1 are reclosed: general ground, circuit already mentioned, pulse springs I1, front B*o*2, back B*s*1, lower winding of relay A*s*, battery. Relay A*s* energizes. Over its front B*o*3 relay B*o* prepares a general holding circuit for the counting relays.

Over its front B*o*4 it completes the following circuit: general holding ground, front B*o*4, relay B*qr*, resistance R*e*2, battery. Relay B*qr* energizes. Over its back B*o*5 relay B*o* prevents the short-circuiting of pulse-stopping contact A*q*1 by front B*o*1.

As already pointed out, the combination of relays B*w* to B*z* operated correspond to the codes registered. The decimal pulses that must be sent back to the originating repeater are counted by the set of relays B*s* to B*v* in accordance with the combination of relays operated in the set of relays B*w* to B*z*.

A description of the counting of the digit 0, which involves 10 successive breaks, will be given as an example.

It has been seen that at the first closing of the contacts of pulse springs I1 relay A*s* was energized over its lower winding.

Over its front A*s*1 relay A*s* completes the following circuit: battery, lower winding of relay A*s*, lower winding of relay B*s*, front A*s*1 and B*o*3, general holding ground. Relay B*s* energizes, but only at the moment of the opening of pulse springs I1. Over its front A*s*2 it prepares the switching in of the second winding of relay A*s*. Over its front A*s*3 relay A*s* completes the following circuit: battery, relay A*r*, front A*s*3, back B*n*4, A*q*1, A*y*1, front B*l*4, general holding ground. Relay A*r* energizes.

Upon energizing, relay A*r* removes over its back A*r*1 the short circuit of pulse springs I2, thus preparing the sending of the decimal pulses to the step-by-step system. The opening and closing phases of pulse springs I1 and I2 are so timed that the short circuit is removed from I2 at the moment of a closing, thus preventing the sending of a first mutilated pulse. When the short circuit is removed from pulse springs I2, pulses are sent to the distant exchange, each pulse corresponding to a break of loop *a*1, *b*1. Over its front A*r*2 relay A*r* completes a holding circuit for itself over a circuit already mentioned.

As pointed out, relay B*s* energizes in series with relay A*s*.

Over its back B*s*1 relay B*s* opens the energizing circuit of relay A*s*, which holds over its contact A*s*1. Over its front B*s*1 relay B*s* prepares the switching in of the second winding of relay A*s*. Over its front B*s*3 associated with B*s*1 it also prepares the switching in of its upper winding. Over its front B*s*4 it completes the following circuit: general ground, front B*o*3 and B*s*4, back B*t*1, lower winding of relay A*t*, battery. Relay A*t* energizes.

Over its front A*t*1 relay A*t* prepares a holding circuit for itself over the lower winding of relay B*t* to the general holding ground. Relay B*t* does not energize; it is short-circuited by contact B*s*4. Over its front A*t*2 relay A*t* prepares the switching in of its upper winding.

The first pulse sent by I1 is therefore characterized by the energization of counting relay B*s*.

At the start of the second pulse, springs I1 close their contacts and the following circuits are completed:

(1) General holding ground, from B*l*4, back A*y*1, A*q*1, B*n*4, springs I1, front B*o*2, B*s*1, A*s*2, upper winding of relay A*s*, battery;

(2) Circuit already described, front B*s*3, upper winding of relay B*s*, battery.

Since the two windings of relay A*s* produce equal fluxes of opposite sense, relay A*s* releases; relay *Bs* holds over its upper winding.

At the end of the second pulse sent by I1, relay B*s*, having its holding circuit open, releases.

Over its front Bs4 relay Bs removes the short circuit of relay Bt, which energizes.

Over its back Bt1 relay Bt opens the energizing circuit of relay At, which holds over the lower winding of relay Bt. Over its front Bt3 it completes the following circuit: general ground, wire f1, front Bo3 and Bt3, back Bu1, relay Au, battery. Relay Au energizes.

Over its front Au1 relay Au prepares a holding circuit for itself through relay Bu to wire f1 and the general holding ground. Relay Bu does not energize, being short-circuited by the energizing circuit of relay Au.

The second pulse is therefore characterized by the energization of counting relay Bt.

At the start of the third pulse, springs I1 reclose their contacts, causing as already described for the first pulse the energization of relays As and Bs. It is to be noted that relay Bs will energize only at the end of the third pulse.

When springs I1 open their contacts relay Bs completes the following circuit over its front Bs4: battery, upper winding of relay At, front At2, Bt1, Bs4, Bo3 and wire f1 grounded. This contact Bs4 also completes a holding circuit for relay Bt to its upper winding through front Bt2.

The two windings of relay At being connected in opposition, relay At releases.

The third pulse is therefore characterized by the energization of counting relays Bs and Bt.

At the start of the fourth pulse, springs I1 close their contacts, causing as already indicated the release of relay As and the holding of relay Bs. At the end of the fourth pulse, when the contacts of springs I1 are reopened, relay Bs releases as has already been explained.

Over its front Bs4 relay Bs opens the holding circuit of relay Bt, which releases. Over its front Bt3 relay Bt opens the short circuit of relay Bu, which can energize. Over its back Bu1 relay Bu opens the energizing circuit of relay Au, which holds over relay Bu. Over its front Bu1 it prepares the energizing circuit of relay Bv.

The fourth pulse is therefore characterized by the energization of counting relay Bu.

At the start of the fifth pulse, springs I1, having closed their contacts, again cause the energization of relay As, which as already described entails the energization of relay Bs at the end of said fifth pulse. Relay Bs causes the energization of relay At through front Bs4.

At the end of the fifth pulse, therefore, only counting relays Bs and Bu are energized.

At the start of the sixth pulse, springs I1 having closed their contacts, relay As releases, its two windings being connected in opposition.

At the end of the sixth pulse, the holding circuit of relay Bs being open at I1, relay Bs releases, removing over its front Bs4 the short circuit of relay Bt; relay Bt energizes in series with relay At.

The sixth pulse is therefore characterized by the energization of counting relays Bu and Bt.

At the start of the seventh pulse, relay As energizes again, this entailing the energization of relay Bs at the end of the pulse.

At this moment, relay Bs energized completes the energizing circuit of relay Bv to the general holding ground over front Bo3, Bt3, Bu1 and Bs5.

Upon energizing, relay Bv completes a holding circuit for itself over its front Bv1. Over its front Bv5 it opens the holding circuit of relays Au and Bu, which release.

The seventh pulse is therefore characterized by the energization of counting relays Bs, Bt and Bv.

At the start of the eighth pulse, relay As releases and at the end of this pulse relay Bs releases in turn, opening at Bs4 the holding circuit of relay Bt, which likewise releases.

The eighth pulse is therefore characterized by the energization of relay Bv.

At the start of the ninth pulse, the closing of the contacts of spring I1 causes the energization of relay As, which causes the energization of relay Bs at the end of the pulse. Over its front Bs4 relay Bs causes the energization of relay At.

The ninth pulse is characterized by the energization of counting relays Bs and Bv.

At the start of the tenth pulse, differential relay As is released in known manner and then at the end of said tenth pulse relay Bs also releases.

According to a known method, the release of relay Bs causes the energization of relay Bt in series with relay At.

The energization of relay Bt causes the energization of relay Au. As has already been seen, relay Bu does not energize, being short circuited by the set of contacts Bu1 and Bt3.

The tenth pulse is therefore characterized by the energization of counting relays Bt and Bv.

As pointed out, the number of decimal pulses that must be sent is determined by the code received on relays Bw to Bz.

It is thus possible to set up a table of relationships between the energized condition of the coding relays and the energized condition of the counting relays for the various pulses.

| Pulse | Coding relays | Counting relays |
|---|---|---|
| 1 | By | Bs |
| 2 | Bw | Bt |
| 3 | Bw By | Bs—Bt |
| 4 | Bx | Bu |
| 5 | Bx—By—Bz | Bs Bu |
| 6 | Bw—Bx Bz | Bt—Bu |
| 7 | Bw By—Bz | Bs—Bt Bv |
| 8 | Bz | Bv |
| 9 | By—Bz | Bs Bv |
| 0 | Bw—Bx—By | Bt Bv |

To stop the sending of the decimal pulses at the desired time, the contacts of the coding relays and of the counting relays are grouped into a pyramid Py1 comprising an incoming wire f2 connected to the general holding ground through the contacts of springs I3 of pulse motor Mot.

It is assumed, for example, that five pulses must be sent to the distant exchange, this corresponding to the energization of relays Bx, By and Bz in accordance with the table. Pulse springs I1 and I2 are so adjusted that after five breaks of loop a1, b1, the chain of counting relays Bs to Bv has received five pulses from springs I1, relays Bs and Bu being then energized. The following circuit is then completed: general holding ground, contacts of springs I3, wire f2, front Bs6, By3, Bx2, Bu3, back Bv2, front Bz1, back Bt5 and Bw2, relay Aq, battery.

The relay Aq energizes and stops the sending of the decimal pulses.

It will be noted that pulse springs I3, also associated with motor Mot, are inserted in the circuit of relay Aq; these springs allow relay Aq to operate only at instants when the counting relays are not in a passing condition likely to give a wrong indication.

Over its back Aq1 relay Aq opens the operating circuit of the counting relays, as also the holding circuit of relay Ar, which releases. Over its front Aq2 it short-circuits spring I2 to end the sending of pulses. Over its front Aq3 relay Aq completes the following circuit: general ground, front Aq3, resistance Re3, relay Awx, battery. Relay Awx, slow to operate, does not energize immediately. Resistance Re3 has beeen provided to increase the operating lag of the relay. Over its front Aq4 relay Aq completes a holding circuit for itself. Without this, this relay would have its circuit broken by pulse springs I3.

Upon releasing, relay Ar provides another short-circuit for cam I2 over its back Ar1.

Slow-to-operate relay Awx finally energizes. It is intended to provide a pause between the sending of two successive decimal-pulse trains, so as to allow the free-line hunting operations by the selectors of the distant exchange.

Over its front Aw1 relay Awx completes a holding circuit for itself. Over its front Aw2 it completes the following circuit: ground, front Aw2, resistance Re4, relay Ayz, battery. Relay Ayz is slow to operate and does not energize immediately.

Relay Ayz energizes after a certain time and completes a holding circuit for itself over its front Ay2. The role of relay Ayz is to increase the pause provided by relay Awx.

Over its front Ay1, relay Ayz short-circuits relay Bo, which releases slowly. Short-circuited, relay Bo finally releases.

Over its front Bo3 relay Bo removes the general holding ground from the counting relays; those among them still energized release. Over its front Bo4 relay Bo removes the short circuit of relay Bp, which then energizes in series with relay Bqr over front Br1.

Upon energizing, relay Bp closes its front Bp2, which short-circuits relay Bqr, and completes a holding circuit for itself through front Bp1.

Short-circuited, relay Bqr finally releases and opens its front Bq2, Bq3, Bq4 and Br2, which isolate coding relays Bw to Bz from wires a, b, c, d leading out from register ER. The release of Bqr also short-circuits relay Bp at Bp2 which releases after a delay.

Upon releasing, the counting relays open the circuit of relay Aq, which releases in turn.

Over its front Aq3 relay Aq opens the holding circuit of relay Awx, which releases, entailing the release of relay Ayz.

Contact Ay1 returning to normal, the pulse sending and counting device is restored to normal position.

Relay Bn is then energized by the register, thereby indicating that all the digits received have been sent out.

If there is still a registered digit in the register, a digit that must be sent out, relay Bn is in normal position and the method of sending out the decimal pulses corresponding to the next digit then develops as has been explained.

When all the digits registered in register ER have been sent out, relay Bn energizes as already mentioned.

Over its front Bn2 relay Bn prepares the energizing circuit of relay Bk. Over its back Bn3 it prevents the energization of the relay Bqr controlling the sending of pulses. Over its back Bn4 relay Bn switches out the chain of counting relays.

No pulse train being then sent by the calling subscriber, relay Bab energizes over wires a and b of said subscriber's loop and the following circuit is completed: ground, front Ba1, Bn2 and Bl5, back Ak1, Ab2, Az1, relay Bk, battery. Relay Bk energizes and will cause the switching of the incoming line to the outgoing line, the register being eliminated, as has been seen, in the case of a call intended for a step-by-step selector system.

Over its front Bk1 relay Bk completes a holding circuit for itself. Over its front Bk2 it switches wire a to wire a1 through front Bl2. Over its front Bk3 it switches wire b to wire b1 through front Bl3.

Over its back Bk5 relay Bk removes the ground from the t wire to control in the feeding bridge the various operations terminating in the connection of the calling subscriber to the originating repeater.

The shifting of wires a, b to wires a1, b1 has been provided in order to prevent a temporary breaking of the line that might be interpreted by the distance exchange as a dialing pulse.

Through the opening of back contacts Bk2 and Bk4, the relay Bab of receiver RE receiving the pulses sent by the calling subscriber releases.

The release of this relay causes in known manner, as described in the patent application already mentioned, the release of the register through removal of the general holding ground.

The calling subscriber is therefore connected to an originating repeater leading to a system equipped with step-by-step selectors. The digits he still has to dial are sent directly to the step-by-step system.

The transfer of the calling subscriber's line to the repeater can be effected only under certain specific conditions:

(1) If the register receiver receives pulses from the calling subscriber at the moment the transfer must be effected, relay Bab releases. By opening its front Ba1 relay Bab prevents the energization of relay Bk, which, as has been pointed out, controls the transfer. The pulse train received will then be registered in normal fashion and the digit sent out according to a method already described.

(2) As has already been explained, the call must be intended for a system equipped with step-by-step selectors for it to be possible for the sending out of decimal pulses to take place. As has been indicated, the energization of relay Bl controls the sending of the decimal pulses into the loop of wires a1, b1. A front contact (Bl5) of relay Bl inserted in the energizing circuit of relay Bk then does not allow the transfer of the calling subscriber to the originating repeater unless the call is actually intended for a step-by-step system.

(3) A digit whose reception has begun must first be fully sent out before the transfer can take place.

The reception of a digit in register receiver RE is translated into the energization of relay Bd. This relay upon energizing completes the following circuit over its front Bd3: general holding ground, wire f0, front Bd3, relay Ak, battery. Relay Ak energizes, holds over Ak2, prevents at Ak1 the energization of relay Bk and consequently the transfer of the calling line to the originating repeater during the reception of a pulse train and until this train has been fully sent out.

This holding circuit will be broken only after the digit received has been sent out. This sending out is evidenced by the energization of relay Aq, which causes the operation of pause relays Awx and Ayz. Upon the operation of relay Ayz, back contact Az2 opens the circuit of the holding circuit of relay Ak, which releases, allowing relay Bk to energize if the other conditions have been met.

(4) In the receiver, relay Ab shows the reception of each pulse train. The back contact Ab2 in the energizing circuit of relay Bk does not allow the energization of this relay unless no digit is then being received.

(5) As has already been pointed out, a predetermined time lag is provided between the sending out of every two decimal-pulse digits in order to allow the free-line hunting operations by the step-by-step selectors of the distant exchange. The last pause relay must have returned to normal before the transfer can be effected. Back contact Az1 indicates this return to normal.

It is well to point out that all these conditions must be met at the same time for it to be possible for the transfer to take place. Failure to meet any one of these conditions would prevent the energization of relay Bk and hence the transfer of the incoming to the outgoing line.

It is quite obvious that the foregoing description has been given only as a nonlimitative example and that numerous modifications can be made without departing from the scope of the invention. For example, it would be possible to provide for the registration of the digits of the call number in decimal form on rotary switches and to effect the exploration of said switches by means of a chain of counting relays or even of rotary switches or of any other counting system.

Further, the improvement covered by the invention can be applied to any type of register.

What is claimed is:

1. An automatic telephone system having call registering apparatus for calls intended for step-by-step automatic switchboards comprising a plurality of lines, a plurality of outgoing trunks, a register, means for connecting said register to a calling line, whereby impulses representing a called line in a step-by-step automatic switchboard may be fed into said register and stored therein, means controlled by said register for selectively connecting an outgoing trunk leading to said step-by-step automatic switchboard, means controlled by said register for sending the impulses so stored required for operating the selectors in said step-by-step switchboard over said selected trunk, means for thereafter directly connecting said calling line and said selected trunk and for releasing said register after said trunk and calling line have been directly connected, whereby any further digits, are sent directly to said step-by-step automatic switchboard by said calling line, and means for preventing the action of said connecting means from causing loss or mutilation of impulses sent directly by said calling line.

2. An automatic telephone system, according to claim 1, further comprising delay means in said register adapted to prevent the operation of said register-release means for a predetermined time.

3. An automatic telephone system, according to claim 2, in which the means for preventing the loss or mutilation of impulses comprises a circuit for operating the means for directly connecting the calling line with the selected outgoing trunk, and means responsive to an impulse from the calling line for opening said circuit.

4. An automatic telephone system, according to claim 1, in which the means for sending the stored impulses over the selected trunk comprises a pair of contacts, means for causing said contacts to break intermittently, means for normally short-circuiting said contacts, a counting device, means controlled by the register for causing said counting device to count the intermittent breaks of said contacts, means operated when said counting device starts counting for disabling said short-circuiting means to remove the short circuits from said contacts means also controlled by said register for stopping said counting device after it has counted a number corresponding to a digit to be transmitted, and means operated by said stopping means for returning said short-circuiting means to its normal condition, the means for directly connecting the calling line with the selected trunk including means controlled by said stopping means for causing the operation of said connecting means after a predetermined delay the means for preventing loss or mutilation of impulses transmitted directly by said calling line comprising means responsive to an impulse received from the calling line to render said directly connecting means ineffective.

5. An automatic telephone system, according to claim 4, in which the means responsive to an impulse received from the calling line comprises a relay connected to said calling line when the register is connected to said calling line and responsive to an impulse from said calling line, the means for causing the operation of the means for directly connecting said calling line with the selected trunk comprising a control circuit, and a contact of said relay included in said control circuit.

6. An automatic telephone system, according to claim 1, in which the means for preventing the loss or mutilation of impulses sent directly by the calling line comprises a control circuit for the means for directly connecting the calling line with a selected trunk, a relay connected to said calling line when the register is connected thereto and responsive to an impulse therefrom, and a contact of said relay in said control circuit adapted to open said control circuit when said relay responds to an impulse from said calling line.

References Cited in the file of this patent

UNITED STATES PATENTS 2,618,708 Ostline ---------------- Nov. 18, 1952